US009445242B2

(12) United States Patent
Barrett

(10) Patent No.: US 9,445,242 B2
(45) Date of Patent: *Sep. 13, 2016

(54) METHODS AND APPARATUSES FOR SUPPLEMENTING MBMS TRANSMISSION TO A RELAY VIA UNICAST TRANSMISSION

(75) Inventor: Stephen Barrett, Haywards Heath (GB)

(73) Assignee: NVIDIA CORPORATION, Santa Clara, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/997,390

(22) PCT Filed: Dec. 16, 2011

(86) PCT No.: PCT/GB2011/052501
§ 371 (c)(1),
(2), (4) Date: Sep. 6, 2013

(87) PCT Pub. No.: WO2012/085543
PCT Pub. Date: Jun. 28, 2012

(65) Prior Publication Data
US 2013/0343259 A1 Dec. 26, 2013

(30) Foreign Application Priority Data
Dec. 24, 2010 (GB) .................................. 1021998.8

(51) Int. Cl.
*H04W 4/06* (2009.01)
*H04L 1/00* (2006.01)
(Continued)

(52) U.S. Cl.
CPC .............. *H04W 4/06* (2013.01); *H04L 1/0041* (2013.01); *H04W 72/005* (2013.01); *H04L 2001/0093* (2013.01); *H04L 2001/0096* (2013.01); *H04L 2001/0097* (2013.01); *H04W 84/047* (2013.01)

(58) Field of Classification Search
None
See application file for complete search history.

(56) References Cited

U.S. PATENT DOCUMENTS 8,428,085 B2 4/2013 Ponnampalam et al.
2008/0070954 A1 3/2008 Lim et al.
(Continued)

FOREIGN PATENT DOCUMENTS

CN 101296401 A 10/2008
EP 2237578 A2 10/2010
(Continued)

OTHER PUBLICATIONS

Communication From a Foreign Counterpart Application, PCT Application No. PCT/GB2011/052504, International Search Report dated Jun. 28, 2012, 4 pages.
(Continued)

*Primary Examiner* — Kodzovi Acolatse

(57) ABSTRACT

A method for supporting broadcast transmission in a wireless communication system (200) that comprises a plurality of communication cells, with broadcast content being routed from a base station (210) to at least one wireless communication unit (225, 226) via at least one relay node (RN) (224) is described. The method comprises, at the base station (210) broadcasting the broadcast content from the base station (210) to at least one from a group consisting of: the at least one RN (224), the at least one wireless communication unit (226); and supplementing the broadcast transmission with at least one augmented unicast transmission associated with the broadcast content. A base station (210), an integrated circuit and a non-transitory computer program product comprising executable program code are also described. A relay node (224), an integrated circuit, a method performed at the relay node and a non-transitory computer program product comprising executable program code are also described.

17 Claims, 7 Drawing Sheets

(51) Int. Cl.
*H04W 72/00* (2009.01)
*H04W 84/04* (2009.01)

(56) References Cited

U.S. PATENT DOCUMENTS

| | | | |
|---|---|---|---|
| 2009/0279480 A1* | 11/2009 | Rosenqvist | H04L 1/1887 370/328 |
| 2009/0285145 A1 | 11/2009 | Youn et al. | |
| 2010/0110960 A1* | 5/2010 | Kim | H04L 1/1861 370/312 |
| 2010/0153806 A1* | 6/2010 | Yu et al. | 714/749 |
| 2010/0254295 A1* | 10/2010 | Ahn et al. | 370/312 |
| 2012/0014286 A1* | 1/2012 | Wang | H04L 27/2602 370/254 |

FOREIGN PATENT DOCUMENTS

| | | |
|---|---|---|
| GB | 2432484 A | 5/2007 |
| WO | 2006133655 A1 | 12/2006 |

OTHER PUBLICATIONS

Communication From a Foreign Counterpart Application, Great Britain Application No. 1021996.2, Great Britain Search Report dated Apr. 21, 2011, 1 page.
"Coopetative Transmission for Broadcast Service in Type II Relay Scenario," 3GPP TSG RAN WG #66bis, ZTE, Document No. R2-093890, Los Angeles, USA, Jun. 29, 2013-Jul. 3, 2013, 4 pages.
"Considerations on Deployment of Both Relay and MBMS," 3GPP-TSG-RAN WG2 Meeting #70bis, CMCC, Document No. R2-103960, Stockholm, Sweden, Jun. 28-Jul. 2, 2010, 4 pages.

* cited by examiner

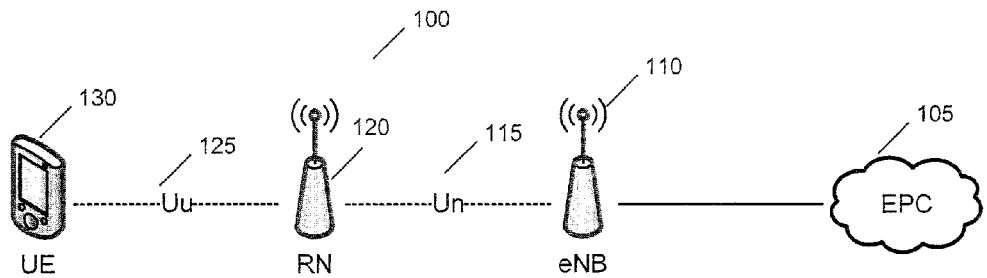
FIG. 1 – Prior Art
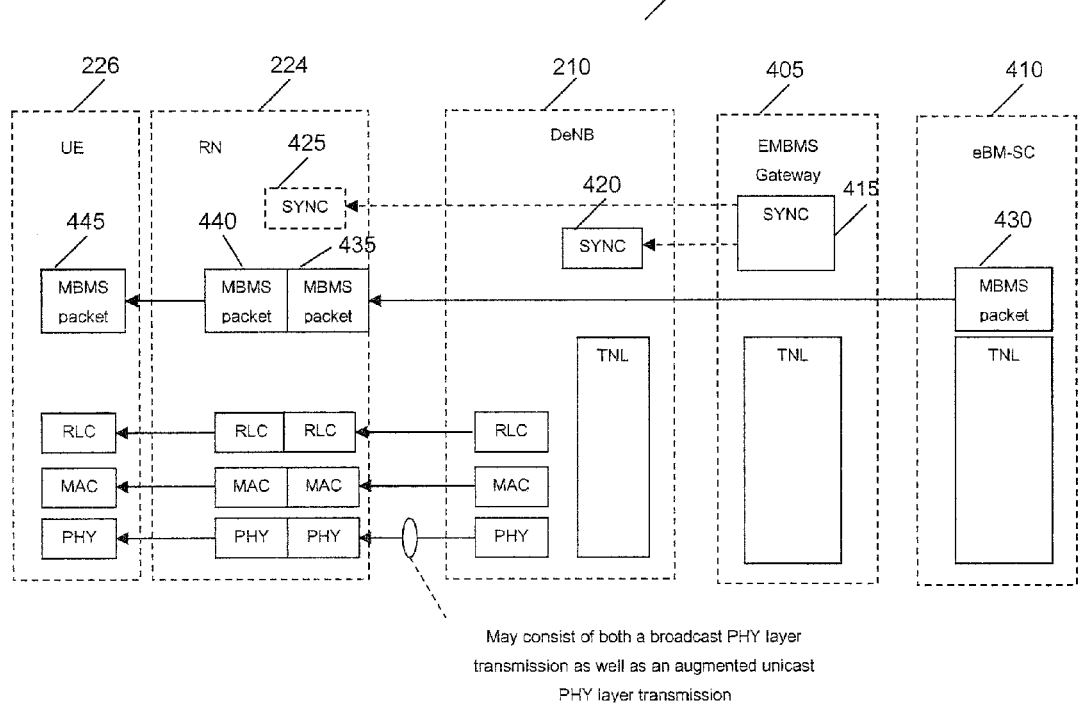
FIG. 4

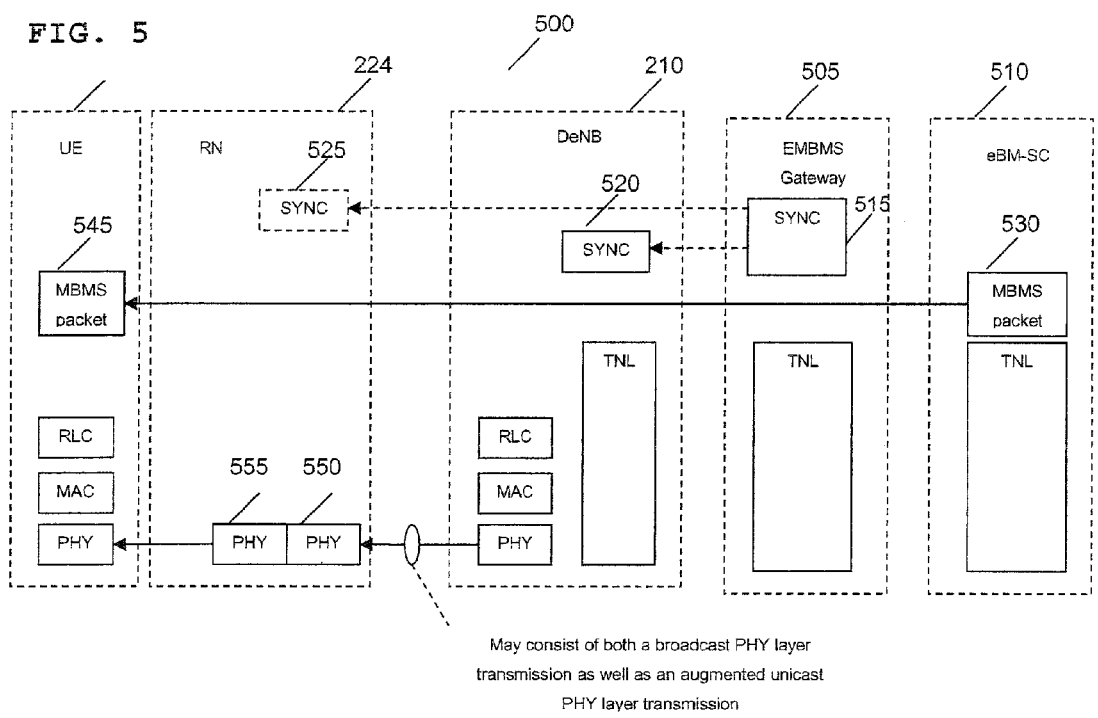

METHODS AND APPARATUSES FOR SUPPLEMENTING MBMS TRANSMISSION TO A RELAY VIA UNICAST TRANSMISSION

CROSS-REFERENCE TO RELATED APPLICATION

This application is the National Stage of, and therefore claims the benefit of, International Application No. PCT/GB2011/052501 filed on Dec. 16, 2011, entitled "METHOD AND APPARATUSES FOR SUPPLEMENTING MBMS TRANSMISSION TO A RELAY VIA UNICAST TRANSMISSION," which was published in English under International Publication Number WO 2012/085543 on Jun. 28, 2012, and has a priority date of Dec. 24, 2010, based on GB application No. 1021998.8. Each of the above applications is commonly assigned with this National Stage application and is incorporated herein by reference in its entirety.

FIELD OF THE INVENTION

The field of this invention relates to utilisation of communication resources in cellular communication systems and in particular, but not exclusively, to a wireless communication unit receiving broadcast communication in a long term evolution (LTE) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading codes and/or scrambling codes to different users on the same carrier frequency and in the same time intervals. This is in contrast to time division multiple access (TDMA) systems, where user separation is achieved by assigning different time slots to different users. An example of communication systems using these principles is the Universal Mobile Telecommunication System (UMTS™).

In order to provide enhanced communication services, the Long Term Evolution (LTE) version of 3rd generation cellular communication systems is designed to support a variety of different and enhanced services. One such enhanced service is a support of multimedia services. The demand for multimedia services that can be received via mobile phones and other handheld devices is set to grow rapidly over the next few years. Multimedia services, due to the nature of the data content that is to be communicated, require a high bandwidth. The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network. Further description of LTE, can be found in Sesia, Toufik, Baker: 'LTE—The UMTS Long Term Evolution; From Theory to Practice', page 11, publ. by Wiley, 2009.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions. Thus, technologies for delivering multimedia broadcast services over cellular systems, such as the evolved Mobile Broadcast and Multicast Service (eMBMS) for the LTE aspect of UMTS™, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell that it is connected to. Notably, this detection needs to be made in the presence of additional, potentially interfering broadcast signals, that are transmitted on the non-overlapping physical resources of adjacent cells.

To improve spectral efficiency, broadcast solutions have also been developed for cellular systems in which the same broadcast signal is transmitted by multiple cells, but using the same (i.e. overlapping) physical resources. In these systems, cells do not cause interference to each other as the transmissions are arranged to be substantially time-coincident, and hence capacity is improved for supporting broadcast services. Such systems are sometimes referred to as 'Single Frequency Networks', or 'SFNs'. In SFN systems, a common cell identifier (ID) is used to indicate those (common) cells that are to broadcast the same content at the same time. In the context of the present description, the term "common cell identifier" encompasses any mechanism for specifying SFN operation, which may in some examples encompass use of, say, a single scrambling code.

In 3GPP™ Rel10 a concept 100 of relay nodes is being considered for LTE, as illustrated in FIG. 1. The relay concept 100 involves a deployment of Relay Nodes (RN's) 120 in order to extend radio coverage over a Uu interface 125 to those subscriber communication units (referred to as user equipment (UE) in 3G parlance) 130 that are within the coverage area of the RN 120. Backhaul connectivity for the RN 120 is provided using the LTE radio resource over the Un interface 115. In this manner, the RN 120 is connected over the LTE radio resource to an evolved packet core (EPC) 105 via a communication source base station (referred to as an evolved NodeB (eNodeB) in 3G parlance) that may be referred to as a Donor eNodeB (DeNB) 110. From the perspective of UE 130 within the coverage of the RN 120, the RN 120 appears as a conventional eNodeB. From the perspective of the Donor eNodeB 110 the RN 120 appears somewhat like a UE 130.

The issue of supporting eMBMS over a RN has been raised in (Tdoc R2-103960: 'Considerations on deployment of both relay and eMBMS'. CMCC, 3GPP TSG-RAN WG2 meeting #70bis, Stockholm, Sweden, 28 Jun.-2 Jul. 2010). In this document a method for extending eMBMS was briefly described as:

'Under this architecture, the content synchronization should be guaranteed not only from BM-SC to DeNB, but also from BM-SC to RN. In this case, the eMBMS related data needs to be transmitted to the DeNB firstly, and then be forwarded towards the corresponding RNs before transmitting to the UEs.'

This extract clearly suggests to those in the art that the Donor eNodeB 110 would first forward eMBMS traffic from the DeNB 110 to the RN 120 using a unicast bearer, although no bearer is specified. Once the RNs 120 have received the eMBMS data then both DeNB's 110 and RN's 120 can transmit the eMBMS data over the single frequency network at the same time, such that UE's 130 can easily combine, at the physical layer, the transmissions received from all eNodeB's and RN's 120 that are within range.

A disadvantage of this approach is that the eMBMS traffic is transmitted twice by the DeNB 110, first in the unicast transmission over the Un interface 115 to the RN 120 and secondly when the DeNB 110 makes the eMBMS broadcast itself over the Uu interface 125. Once the RNs 120 have received the eMBMS data, then both DeNBs 110 and RNs 120 are able to transmit the eMBMS data over the single frequency. All transmissions from the relay node layer (or alternatively, simultaneously from both the relay node layer and the eNodeB layer) should occur at the same time. This ensures that any macro-diverse eMBMS transmissions from multiple DeNBs 110/RNs 120 arrive at the UE 130 with time offsets that fall within the cyclic prefix of the OFDM symbol, thereby simplifying the UE's equalisation process e.g. combining at the physical layer the transmissions from all enodeB's and RN's within range. If there are multiple RNs 120 within the coverage of the DeNB 110 then multiple unicast streams carrying the same information would be necessary. This repeated transmission has the disadvantage that it consumes additional eNB radio resources.

A further potential problem with this proposed mechanism is that propagation delays between each RN 120 and its associated DeNB 110 are likely to be different. Thus, should each RN 120 simply re-broadcast the eMBMS information received from the DeNB 110 as soon as the RN 120 receives it, then due to the propagation delay differences on the Un interfaces 115, the transmissions from multiple RNs 120 could not be guaranteed to arrive at the UE 130 within the cyclic prefix window of the UEs (given that there will also be accumulative propagation delay differences on each of the Uu interfaces). Such a problem occurs, for example, if all transmissions from relay nodes were planned to occur at the same time (for example for multicast broadcast SFN (MBSFN) physical layer combining of relay node transmissions at the UE 130), or if it is desired that RN transmissions be symbol aligned with the transmissions from the DeNB 110, so that combining can be achieved at the UE 130 of both DeNB 110 and RN transmissions.

A further potential problem with this proposed mechanism is that it is important that each RN decodes the eMBMS traffic received from the DeNB as accurately as possible, since it may be re-broadcasting this information to many tens or hundreds of UEs. Thus, a probability of correct detection of the eMBMS signal at the RN needs to be high.

Consequently, current techniques are suboptimal. Hence, an improved mechanism to address the problem of supporting broadcast transmissions using relay nodes in a cellular network would be advantageous.

SUMMARY OF THE INVENTION

Various aspects and features of the present invention are set out in the claims.

Embodiments of the invention seek to mitigate, alleviate or eliminate one or more of the abovementioned disadvantages singly or in any combination.

According to a first aspect of the invention, there is provided a method for supporting broadcast transmission in a wireless communication system that comprises a plurality of communication cells, with broadcast content being routed from a base station to at least one wireless communication unit via at least one relay node (RN). The method comprises, at the base station: broadcasting the broadcast content from the base station to at least one from a group consisting of: the at least one RN, the at least one wireless communication unit; and supplementing the broadcast transmission with at least one augmented unicast transmission associated with the broadcast content. In this manner, repeated transmission of broadcast content, such as eMBMS traffic, by the base station, such as a Donor eNodeB, may be avoided or reduced, thereby supporting a more efficient usage of radio resources in the cellular communication system.

In one optional example embodiment, the at least one augmented unicast transmission carries additional error coding redundancy bits may be associated with the broadcast content. In one optional example embodiment, the additional error coding redundancy bits may be computed from the broadcast content. In this manner, the use of the at least one augmented unicast transmission may improve a probability of correct detection of the eMBMS signal at the RN, as it is important that each RN decodes the eMBMS traffic received from the DeNB as accurately as possible, since it may be re-broadcasting this information to many tens or hundreds of UEs In one optional example embodiment, the at least one augmented unicast transmission may carry the same content, either partially or in its entirety, as the broadcast content.

In one optional example embodiment, the at least one augmented unicast transmission may not convey the broadcast content.

In one optional example embodiment, the method may further comprise dynamically initiating a transmission of the at least one augmented unicast transmission to a single RN or a plurality of RNs.

In one optional example embodiment, the method may further comprise dynamically adjusting a parameter of the at least one augmented unicast transmission, wherein the parameter comprises at least one from a group consisting of: a transmit power level used for the at least one augmented unicast transmission; a data rate employed on the augmented unicast transmission; a selected modulation scheme; a selected time and/or frequency resource on which the augmented unicast transmission is to be made; a number of redundant physical layer bits conveyed on the augmented unicast transmission. In this manner, should the prevailing channel condition between the DeNB and a particular RN be poor, a particular parameter of the augmented unicast transmission may be dynamically adjusted and employed only for that RN. In some example embodiments, the one or more RN(s) use(s) the information provided in the augmented unicast transmission data stream to improve its/their probability of detection of the received eMBMS data stream.

In one optional example embodiment, the aforementioned at least one of dynamically initiating and dynamically adjusting may be implemented based on at least one from a group consisting of: a prevailing channel condition between the base station and the at least one RN; feedback information on a signal quality of a broadcast channel provided from the at least one RN to the base station; a quality of a combined broadcast and unicast transmission.

In one optional example embodiment, the base station is a donor eNodeB in a Long Term Evolution (LTE) version of a Third Generation Partnership Project (3GPP™) system.

According to a second aspect of the invention, there is provided a non-transitory computer program product comprising executable program code for supporting broadcast transmission in a wireless communication system substantially in accordance with the first aspect.

According to a third aspect of the invention, there is provided a base station for supporting broadcast transmission in a wireless communication system that comprises a plurality of communication cells, with broadcast content being routed from the base station to at least one wireless communication unit via at least one relay node (RN). The base station comprises signal processing logic for broadcasting the broadcast content to at least one from a group consisting of: the at least one RN, the at least one wireless communication unit; and supplementing the broadcast transmission with at least one augmented unicast transmission associated with the broadcast content.

According to a fourth aspect of the invention, there is provided an integrated circuit for a base station comprising signal processing logic substantially in accordance with the third aspect.

According to a fifth aspect of the invention, there is provided a method for supporting broadcast transmission in a wireless communication system that comprises a plurality of communication cells, with broadcast content being routed from a base station to at least one wireless communication unit via a relay node (RN). The method comprises, at the relay node: receiving a broadcast transmission of broadcast content from the base station; and receiving a supplementary at least one augmented unicast transmission from the base station wherein the at least one augmented unicast transmission is associated with the broadcast content.

According to a sixth aspect of the invention, there is provided a non-transitory computer program product comprising executable program code for supporting broadcast transmission in a wireless communication system substantially in accordance with the fifth aspect.

According to a seventh aspect of the invention, there is provided a relay node for supporting broadcast transmission in a wireless communication system that comprises a plurality of communication cells, with broadcast content being routed from a base station to at least one wireless communication unit via the relay node (RN). The RN comprises signal processing logic for: receiving a broadcast transmission of broadcast content from the base station; and receiving a supplementary at least one augmented unicast transmission from the base station wherein the at least one augmented unicast transmission is associated with the broadcast content.

According to an eighth aspect of the invention, there is provided an integrated circuit for a relay node comprising signal processing logic substantially in accordance with the seventh aspect.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which:

FIG. 1 illustrates a known architecture of system deployment with a relay node.

FIG. 4 illustrates a first example of a user-plane protocol stack employed by various communication units in accordance with some example embodiments of the present invention.

FIG. 5 illustrates a second example of a user-plane protocol stack employed by various communication units in accordance with some example embodiments of the present invention.

DETAILED DESCRIPTION OF EMBODIMENTS OF THE INVENTION

Figure 2:
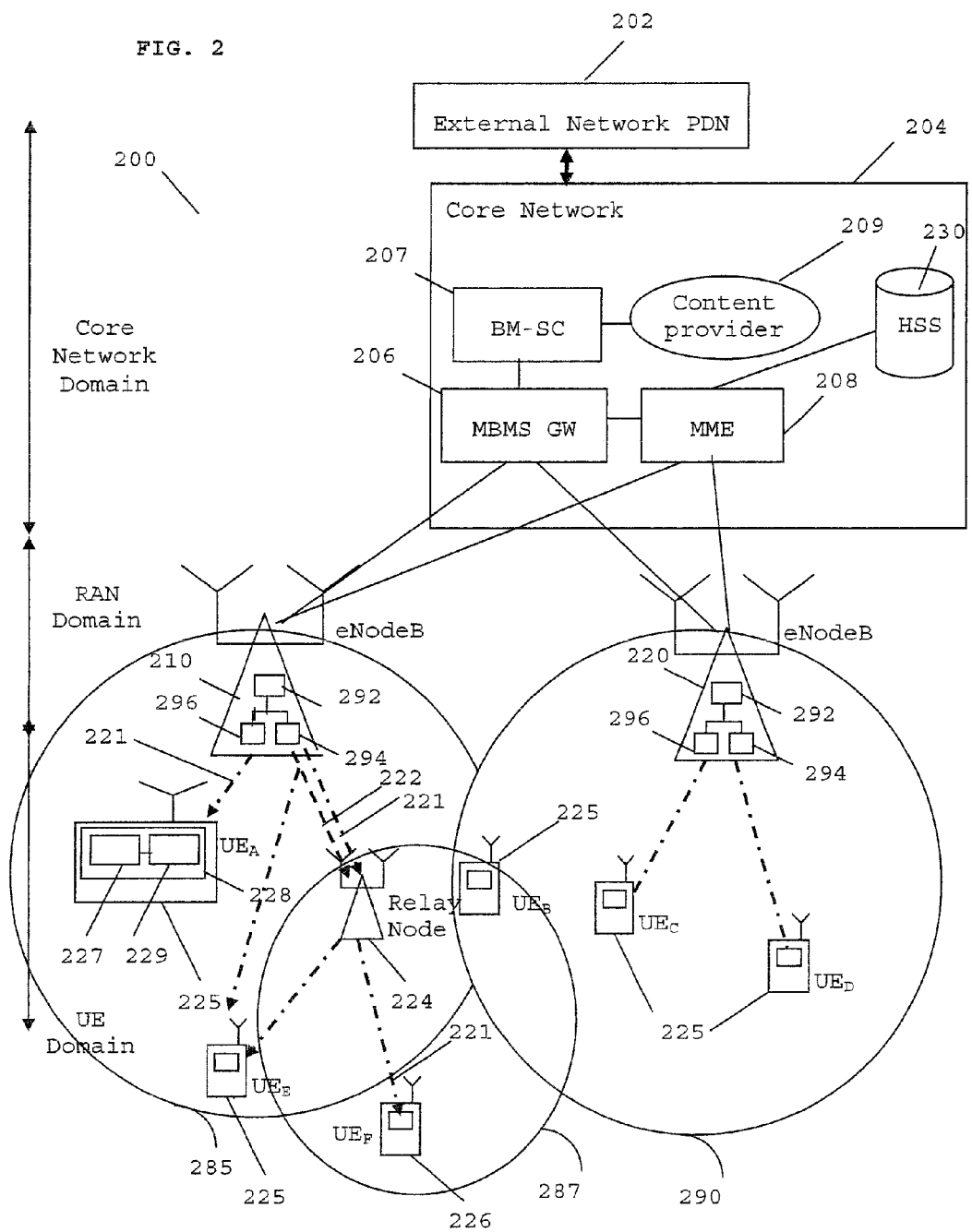
FIG. 2 illustrates a 3GPP™ LTE cellular communication system employing at least one relay node in accordance with some example embodiments of the present invention.

The following description focuses on example embodiments of the invention applicable to a Long Term Evolution (LTE) cellular communication system and, in particular, to an LTE Radio Access Network (RAN) operating in any paired or unpaired spectrum within a $3^{rd}$ generation partnership project (3GPP™) system. However, it will be appreciated that the invention is not limited to this particular cellular communication system, but may be applied to any cellular communication system supporting broadcast communication. The following description also focuses on example embodiments of the invention applicable to providing broadcast (e.g. uni-directional) services on an LTE cellular communication system, for example one supporting an evolved Mobile Broadcast and Multicast Service (eMBMS).

eMBMS is a broadcasting and multicasting service offered over mobile telecommunications networks, such as the Evolved Packet System (EPS), and the like. The technical specifications for eMBMS include 3GPP™ TS 22.146, 3GPP™ TS 23.246 and 3GPP™ TS 26.346.

Example embodiments described herein may be applied to a scenario whereby eMBMS data is transported over LTE relay nodes (RNs). Example embodiments of the present invention may alleviate the aforementioned problem of a DeNB transmitting the same eMBMS content on both a unicast channel (to one or more Relay Nodes (RNs)) and on an eMBMS broadcast channel (to UEs within the coverage of the DeNB). In example embodiments of the present invention, a base station, say in a form of a Donor eNodeB (DeNB), may be configured to perform a broadcast eMBMS transmission that is received by UEs within the coverage range of the DeNB, as well as received by the one or more Relay Node (RNs) within the coverage range of the DeNB, for example one or more RNs that is/are arranged to provide an extended coverage area for the broadcast eMBMS data. Example embodiments of the present invention propose a mechanism whereby the one or more RNs subsequently re-broadcast the eMBMS data to the wireless subscriber communication units, such as user equipment (UEs) that are located within the coverage of the one or more RNs. For UEs that are located within the coverage area of both the DeNB and the one or more RN(s), the UEs within coverage of both the RN and DeNB may be able to use appropriate buffering circuitry and combining techniques to receive and combine both broadcast transmissions, either before or after decoding. In this manner, a duplicate transmission of the same information from the DeNB, as is proposed in the known art, does not occur.

In the example embodiment of the present invention, a mechanism is described that may improve a probability of correct detection of the eMBMS signal at the RN, as it is important that each RN decodes the eMBMS traffic received from the DeNB as accurately as possible, since it may be re-broadcasting this information to many tens or hundreds of UEs. In the example, the eMBMS broadcast transmission from the DeNB is augmented with a unicast transmission. In one example, the augmented unicast transmission is transmitted from the DeNB to the one or more RNs at substantially the same time as the eMBMS broadcast transmission. However, in this example, the augmented unicast transmission may not convey the same information as is conveyed on the eMBMS broadcast (data) transmission. In one example embodiment, the augmented unicast transmission may carry additional error coding redundancy bits, which may be computed from the eMBMS data and may be additional to those already included within the main eMBMS data stream.

In the current LTE standard, when MBMS traffic is transmitted, it is transmitted in subframes (1 msec blocks) that are dedicated for the MBMS transmission (i.e. these 'MBMS' subframes cannot e.g. be shared for the transmission of unicast traffic). Hence, in one example embodiment, the augmented unicast transmission may be made in a separate sub-frame, for example separate other 1 msec blocks to the MBMS transmission. In some example embodiments, both MBMS and augmented unicast transmissions might be sent in different sub-frames of the same 10 msec frame. In some example embodiments, both MBMS and augmented unicast transmissions might be sent in different 10 msec frames, albeit that this may entail some additional buffering at the relay node.

In some example embodiments, a variety of different methods may be used for determining the bits that must be transmitted on the MBMS bearer and the bits that must be transmitted on the augmented unicast bearer. For example, in some example embodiments, any of the techniques used in Automatic Repeat reQuest (ARQ)/Hybrid ARQ (HARQ) for coding the first transmission and encoding a second transmission may be used, where the coded bits of the first transmission would in some examples correspond to the bits that would be transmitted on the MBMS bearer and the coded bits of the second transmission would correspond to the bits that would be transmitted on the augmented unicast bearer. At the relay node, in some example embodiments, the same methods that are conventionally used for combining first and second ARQ/HARQ transmissions can be used for combining MBMS and augmented unicast transmissions. Hence in one example embodiment the DeNB may take the raw information content and determine a set of forward error correction (FEC) redundancy bits using a channel coding algorithm. A fixed proportion of these redundant bits may always be transmitted alongside the raw information bits on the MBMS bearer. Depending on prevailing channel conditions between the DeNB and the RN additional redundancy bits, which were not sent on the MBMS bearer, may be sent on the augmented unicast bearer. At the receiver the relay node (or the UE in a UE scenario where the RN also transmits the augmented unicast transmission) uses the full set of redundancy bits provided on both the MBMS bearer and on the augmented unicast bearer, in conjunction with the received raw information bits. In this manner, the RN may be able to determine the most likely transmitted codeword and to thereby determine the most likely sequence of raw information bits. In some examples, a variety of similar techniques based around methods such as Hybrid ARQ Chase combining and Hybrid ARQ incremental redundancy may be used.

In addition, in some example embodiments, such an augmented unicast transmission may be dynamically employed, for example by initiating an augmented unicast transmission as and when necessary, according to, for example prevailing channel conditions between the DeNB and the respective one or more RNs. Thus, should the prevailing channel condition between the DeNB and a particular RN be poor, the augmented unicast transmission may be employed only for that RN. In some example embodiments, the one or more RN(s) use(s) the information provided in the augmented unicast transmission data stream to improve its/their probability of detection of the received eMBMS data stream.

In one example, the augmented unicast transmission over the Un interface may not be received by any of the UEs within the coverage area of the DeNB or of the RN. Hence, this potentially useful information would not be used by any of the UEs to improve the probability of detection of the subsequent eMBMS transmissions in the UEs themselves. Therefore, in another example embodiment, UEs may also be configured to be able to receive and decode/combine the augmented unicast transmission, thereby improving the quality of service as measured at the UE. In addition, repeated transmission of eMBMS traffic by the DeNB may be avoided or reduced, thereby supporting a more efficient usage of radio resources.

Furthermore, in some example embodiments, the receiving UE may be configured to receive a broadcast transmission of broadcast content from at least one from a group consisting of: such as the base station (e.g. DeNB) and the at least one relay node (RN). The receiving UE may also be configured to receive a supplementary at least one augmented unicast transmission from at least one from a group consisting of: the base station (e.g. DeNB) and the at least one relay node (RN, wherein the at least one augmented unicast transmission is associated with the broadcast content. In this example, the UE as well as the RN may also benefit from the additional information contained in the at least one augmented unicast transmission.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system architecture for an Evolved-UMTS Terrestrial Radio Access Network (E-UTRAN) wireless communication system, which is currently under discussion in the third Generation Partnership Project (3GPP™) specification for long term evolution (LTE) standard, which is based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined. In particular, the example embodiment of the LTE system may be adapted to support both broadcast and augmented unicast E-UTRAN communication in one or more communication cells.

The architecture consists of radio access network (RAN) elements and core network (CN) elements, with the core network 204 being coupled to external networks 202 named Packet Data Networks (PDNs), such as the Internet or a corporate network. The main component of the RAN is an eNodeB (an evolved NodeB) 210, 220, which is connected to the CN 204 via a S1 interface and to the UEs 225 via an Uu interface. A wireless communication system will typically have a large number of such infrastructure elements where, for clarity purposes, only a limited number are shown in FIG. 2. The eNodeBs 210, 220 control and manage the radio resource related functions for a plurality of wireless subscriber communication units/terminals (or user equipment (UE) 225 in UMTS™ nomenclature). As illustrated, each eNodeB 210, 220 comprises one or more wireless transceiver unit(s) 294 that is/are operably coupled to a signal processor module 296 and a scheduler 292. The eNodeBs 210, 220, are operably coupled to an MBMS gateway 206 in the core network (CN) via an M1 interface and to a mobility management entity (MME) 208 in the core network (CN) via an M3 interface. The MME 208 manages session control of MBMS bearers and is operably coupled to a home subscriber service (HSS) database 230 storing UE related information. The MBMS gateway 206 acts as a mobility anchor point and provides IP multicast distribution of the MBMS user plane data to the eNodeBs. The MBMS gateway 206 receives MBMS content via the Broadcast Multicast-Service Centre (BM-SC) 207 from one or more content providers 209.

The series of eNodeBs 210, 220 typically perform lower layer processing for the network, performing such functions as Medium Access Control (MAC) operations, formatting blocks of data for transmission and physically transmitting transport blocks to UEs 225. In addition to these functions that the eNodeBs 210, 220 usually perform, the adapted schedulers 292 of eNodeBs 210, 220 are additionally arranged to respond to demands for resource from the UEs 225 by allocating resource in either or both UL and/or DL time slots for individual UEs 225 to use.

In one example embodiment, the eNodeB 210 broadcasts eMBMS content to relay node (RN) 224 (with only one RN shown for clarity purposes), located within its coverage range 285, for relaying to UEs within the coverage of the RN 224, which includes UE 226 that is located outside of the coverage range of eNodeB 210.

An E-UTRAN RAN is based on OFDMA (orthogonal frequency division multiple access) in downlink (DL) and SC-FDMA (single carrier frequency division multiple access) in uplink (UL), where the further information of radio frame formats and physical layer configuration used in E-UTRAN can be found in 3GPP™ TS 36.211 v.9.1.0 (2010-03), '3GPP Technical specification group radio access network, physical channels and modulation (release 9).

Each of the UEs comprise a transceiver unit 227 operably coupled to signal processing logic 229 (with one UE illustrated in such detail for clarity purposes only) and communicate with the eNodeB 210 supporting communication in their respective location area. The system comprises many other UEs 225, RNs 224 and eNodeBs 210, 220, which for clarity purposes are not shown.

In the illustrated example, eNode-B 210 broadcasts eMBMS data 221 over geographic area 285. The broadcast eMBMS data 221 is received by UEs 225 and any Relay Nodes (RNs), such as RN 224 within coverage range 285. RN 224 supports broadcast eMBMS communication over geographic area 287. As illustrated, eNodeB 210 comprises a transmitter 294 that is operably coupled to a signal processor module 296 and a timer 292. Embodiments of the invention utilize the signal processor module 296 and timer 292 to configure broadcast transmissions from the eNodeB 210.

In one example embodiment of the invention, considering the eNodeB 210 as a donor eNodeB (DeNB) in providing broadcast data to the recipient RN 224, it is envisaged that additional physical layer redundancy may be provided on the eMBMS unicast transmission from the DeNB 210 to the one or more RNs 224 compared to the physical layer redundancy that may be provided on the eMBMS broadcast transmission from the RN 224 to UEs 225, 226. In one example embodiment, it is envisaged that such additional physical layer redundancy may be provided dynamically, for example dependent upon the prevailing communication conditions. In one example embodiment, it is envisaged that such additional physical layer redundancy may be provided as the de facto mode of operation.

Figure 3:
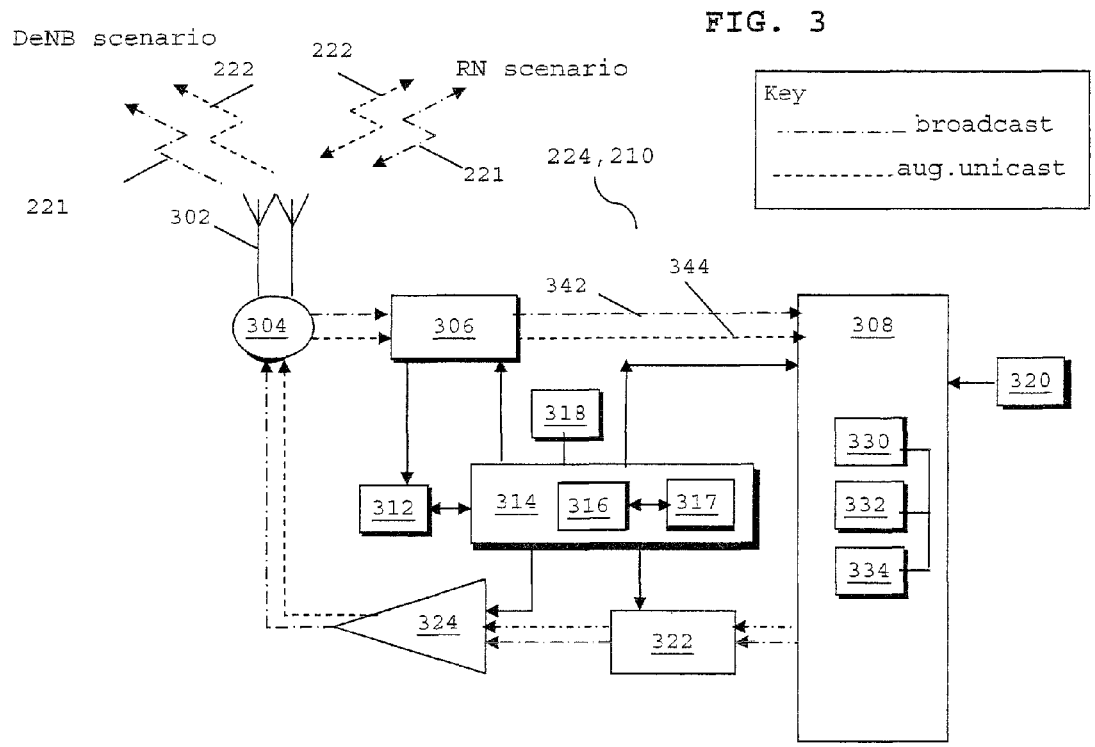
FIG. 3 illustrates an example of a wireless communication unit adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a DeNB 210 or a RN 224, as the functional elements are very similar. The wireless communication unit, DeNB 210 or RN 224 contains an antenna, an antenna array 302, or a plurality of antennae, coupled to antenna switch 304 that provides isolation between receive and transmit chains within the wireless communication unit 314. One or more receiver chains, as known in the art, include receiver front-end circuitry 306 (effectively providing reception, filtering and intermediate or base-band frequency conversion). The receiver front-end circuitry 306 is coupled to a signal processing module 308. The one or more receiver chain(s) is/are operably configured to receive a broadcast data packet stream in one or more sub-frames over a eMBMS network. In an example embodiment, and when considering the wireless communication unit as a RN 224, separate receiver chains (not shown) may be used for receiving the broadcast and augmented unicast transmission. A skilled artisan will appreciate that the level of integration of using receiver circuits or components may be, in some instances, implementation-dependent.

A controller 314 maintains overall operational control of the wireless communication unit 210, 224. The controller 314 is also coupled to the receiver front-end circuitry 306 and the signal processing module 308 (generally realised by a digital signal processor (DSP)). In some examples, the controller 314 is also coupled to a buffer module 317 and a memory device 316 that selectively stores operating regimes, such as decoding/encoding functions, synchronisation patterns, code sequences, and the like. A timer 318 is operably coupled to the controller 314 to control the timing of operations (transmission or reception of time-dependent signals) within the wireless communication unit 210, 224.

As regards the transmit chain, this essentially includes an eMBMS input module 320, coupled in series through transmitter/modulation circuitry 322 and a power amplifier 324 to the antenna, antenna array 302, or plurality of antennae. The transmitter/modulation circuitry 322 and the power amplifier 324 are operationally responsive to the controller 314. In both instances of a DeNB 210 and a RN 224, the transmit chain is operably configured to broadcast an eMBMS data packet stream.

The signal processor module 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 210, 224 can be realized in discrete or integrated component form, with an ultimate structure therefore being an application-specific or design selection.

In one example, when the communication unit is functioning as a RN 224, the RN 224 may be configured as a simple repeater, whereby it receives a broadcast eMBMS transmission from the DeNB 210, performs any demodulation, decoding, error correction, encoding, modulation and re-broadcasts the eMBMS data.

In a first example, and referring now to FIG. 4, a first user-plane protocol stack 400 employed by various communication units, is illustrated, in accordance with some example embodiments of the present invention. The communication path of an MBMS data packet 430 traverses from an eBM-SC 410 through an eMBMS gateway 405 and a DeNB 210 to a RN 224 and thereafter one or more UEs 226. In this first example, when the communication unit is functioning as a RN 224, the RN 224 may be configured with enhanced functionality to de-multiplex multiple eMBMS streams to various UE's, such as UE 226. In this first example, the RN 224 may perform functions in a similar manner to an intelligent repeater, inasmuch as the RN 224 may comprise sufficient transceiver and signal processing functionality/modules to attempt to unpack all the protocol layers, e.g. the radio link control (RLC) layer, the medium access control (MAC) layer and the physical (PHY) layer from the transmission from the DeNB 210. In essence, the protocol stack for the receive side of the RN 224 may appear similar to the MBMS protocol stack for the UE 226 (in a conventional non-RN deployment). However, there is one notable difference in this example, being that the PHY connection between DeNB 210 and RN 224 may contain an augmented unicast transmission (e.g. extra PHY layer redundancy information) to improve the probability of correct codeword detection, in accordance with one enhanced example embodiment.

The transmit side of the RN 224 may appear similar to the transmit protocol stack of a DeNB 210 (in a network without a relay node), with an exception in one example embodiment that the MBMS packet may be re-constructed 435, 440 in the RN 224. The UE protocol stack is shown as per a system without a RN, with the received, re-constructed MBMS data packet 445 decoded.

In this example, there may be a number of benefits in unpacking all the protocol layers in the RN 224. For example, if the RN 224 is unable to decode one of the MBMS packet data blocks that make up a complete MBMS data packet, the RN 224 may not relay the complete MBMS packet to UE's, such as UE 226, under the RN 224. This scenario avoids the RN 224 needlessly forwarding transport blocks that the UE 226 would only ever be able to use in formulating a partial MBMS packet); at least for example for the case of single cell broadcast from the RN 224. Furthermore, in this example, the RN 224 may be able to transmit a subset of the services that are available on the DeNB 210, so that some de-multiplexing of services and some re-packaging of a subset of services can be performed at the RN 224.

In a further second example, and referring now to FIG. 5, a second user-plane protocol stack 500 employed by various communication units is illustrated in accordance with some example embodiments of the present invention. Again, the communication path of an MBMS data packet 530 traverses from an eBM-SC 510 through an eMBMS gateway 505 and a DeNB 210 and a RN 224 to one or more UEs 226. In this second example, when the communication unit is functioning as a RN 224 to de-multiplex and broadcast multiple eMBMS streams to various UE's 226, the RN 224 may be configured with enhanced functionality. In this second example, the RN 224 may perform functions in a similar manner to an intelligent repeater, for example comprising sufficient transceiver and signal processing functionality/modules to attempt to recover the physical (PHY) layer MBMS data packet 550/channel and re-transmit the data packet 555.

In some examples, in either the first user plane architecture of FIG. 4 or the second user plane architecture of FIG. 5, a SYNC protocol 425, 525 may be extended also to the RN 224. In other examples in either the first user plane architecture of FIG. 4 or the second user plane architecture of FIG. 5, the SYNC protocol may be used to ensure synchronised multi-cell content transmission. In yet a further variant (not shown), instead of a SYNC protocol running between E-MBMS gateway 405, 505 and RN 224, there could alternatively be a SYNC protocol running from E-MBMS gateway to DeNB 210 and another SYNC protocol running from DeNB 210 to the RN 224. In yet a further variant (not shown), no SYNC protocol may be used or required.

Figure 6:
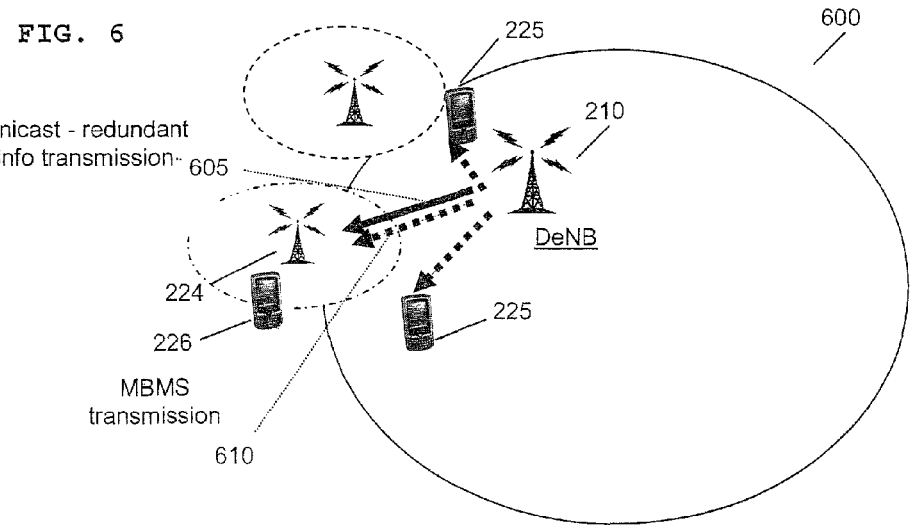
FIG. 6 illustrates an example of a 3GPP™ wireless cellular communication system employing at least one relay node in accordance with an example embodiment of the present invention.

Referring now to FIG. 6, an example of a 3GPP™ wireless cellular communication system 600 employing at least one relay node is illustrated in accordance with an example embodiment of the present invention. In particular, FIG. 6 illustrates a wireless communication system showing eMBMS broadcast transmission 610 within coverage of a DeNB 210 and unicast transmission 605 of redundant (FEC) physical layer bits between the DeNB 210 and RN 224 in accordance with some example embodiments of the invention.

In one example, eMBMS broadcast transmissions 610 from the DeNB 210 are augmented with one or more unicast transmissions 605. In one example, the augmented one or more unicast transmissions 605 are made from the DeNB 210 to the RN 224 at the same time as the eMBMS transmission 610. In one example, the augmented one or more unicast transmissions 605 are selectably and dynamically initiated from the DeNB 210 to the RN 224 dependent upon prevailing communication conditions.

In the example embodiments of the invention, the one or more augmented unicast transmissions 605 do not (typically) convey the same information as the broadcast information conveyed on the eMBMS transmission. In contrast, the one or more augmented unicast transmissions 605 are arranged to carry additional error coding redundancy bits. In this example, the additional error coding redundancy bits may be computed from the eMBMS data, and may be configured to be additional information to that data already included within the main eMBMS data stream.

In one example, the receiver 206 and signal processing module 308 of the RN 224 use the information provided in the augmented unicast data stream 605 to improve the probability of successful detection of the received eMBMS data stream 610. It is noteworthy that in normal prevailing communication conditions, the error detection/correction information contained in the received eMBMS data stream 610 may be sufficient to perform adequate error detection and correction of the eMBMS data, as any UEs 226 within the coverage area of the DeNB 210 should be able to receive and decode the eMBMS broadcast data stream without requiring the additional information available from the augmented unicast data stream.

In one example embodiment of the invention, physical layer (forward error correction (FEC)) redundancy information may be provided on the augmented unicast channel. In this case the augmented unicast channel may convey an incremental redundancy stream that the signal processing module 308 of the RN 224 may be able to combine with the eMBMS stream in order to better decode the eMBMS broadcast data stream 610.

In one example embodiment of the invention, the power level used on the augmented unicast channel, the data rate employed on the augmented unicast channel and/or the number of redundant physical layer bits conveyed on the augmented unicast channel may be dynamically adjusted, according to prevailing channel conditions on the Un interface 115. In one example, this may be achieved by the RN 224 providing feedback to the DeNB 210 via a feedback channel (not shown), for example based on eMBMS bit error rate (BER) or signal to interference (or interference plus noise) (SIR) computations.

In one example embodiment of the invention, when the communication unit in FIG. 3 is a DeNB 210, the signal processing module 308 may be arranged to determine whether the eMBMS communication channel(s) between the DeNB 210 and the one or more RNs 224 may be undergoing fading conditions that affect the correct synchronisation and decoding of frequency/time blocks used for the eMBMS transmission. In this example, the signal processing module 308 of the DeNB 210 may be arranged to schedule augmented unicast transmissions 605 in non fading time/frequency resource units, thereby reducing the adverse impact of the fading channel condition.

In one example embodiment of the invention, when the communication unit in FIG. 3 is a DeNB 210, the signal processing module 308 may be arranged to configure the augmented unicast transmission 605 to include a substantial portion or all the available information and, thus, not limited to redundant bits associated with the augmented unicast communication 605. In this manner, the signal processing module 308 may again be arranged to schedule augmented unicast transmissions 605 in non fading time/frequency resource units, thereby reducing the adverse impact of the fading channel condition.

In one example embodiment of the invention, it is envisaged that any UE within the coverage area of the DeNB 210, which may be capable of receiving both the eMBMS broadcast transmission on the eMBMS broadcast channel as well as the augmented unicast transmission 605 on the augmented unicast channel may make use of the additional data/information supplied on the augmented unicast channel (noting that, in some examples, the RN 224 will be controlling a number of parameters associated with the augmented unicast channel e.g. the transmit power, incremental redundancy rate, frequency/time slots used, etc.).

In one example embodiment of the invention, a scenario is envisaged where there are multiple RNs 224 being served by a single DeNB 210. In this case the extra redundancy information provided by the signal processing module 308 of the DeNB 210 may be provided over one or more additional unicast/multicast channel(s). In this example, the signal processing module 308 of the DeNB 210 may select/set certain parameters, such as power levels, redundancy rate, etc. according to, say, feedback from all/any of the RNs 224 that desire or require the augmented transmission 605 (in this scenario the augmented channel is multicast) at a particular point of time. In this example, the signal processing module 308 of the DeNB 210 may select/set certain parameters based on the most demanding criteria from any of the RNs, thereby ensuring that multicast transmissions to all RNs are being supported, e.g. the signal processing module 308 may select/set a highest power level, a greatest number of incremental bits requested by any of the relay nodes, etc.

In some examples, at times when the eMBMS broadcast channel between the DeNB 210 and RN 224 over the Un interface is good, and the augmented unicast channel is not required, then the frequency/time blocks that might otherwise have been used for carrying the augmented unicast channel, can be configured for carrying unicast transmissions to any of the UE's 226 within the coverage area of the DeNB 210.

In summary, in some examples, embodiments of the invention may provide the advantage of avoiding at least one duplicate transmission of the same information on both unicast and eMBMS channels. However, in some examples, embodiments of the invention may provide a mechanism by which if one or more RNs 224 is/are struggling to correctly decode the eMBMS transmission, at any particular point in time, then the quality of reception may be adaptively improved/augmented as necessary using information provided on an augmented unicast channel. In some examples, the radio resources consumed in transmitting the augmented unicast channel may on average be much less than the radio resources consumed when the unicast channel (of the prior art solution) is used. In the known prior art solution, all the broadcast content plus redundancy coding needs to be included in a unicast transmission for every eMBMS frame transmitted, whereas in example embodiments of the present invention the augmented channel is only required when the RN cannot receive the broadcast transmission. Even when broadcast content plus redundancy coding is required, it may only carry a smaller number of additional bits than the known prior art solution, e.g. just some extra redundancy bits.

Thus, advantageously, no modification to the core network and associated services/applications is required to achieve some example aims of the aforementioned embodiments.

In some examples, the transmission from the DeNB 210 to the RN 224 may use single cell or multi-cell MBSFN. In some examples, the transmission from the RN 224 to UEs may comprise one or more of the following:

a) An MBSFN broadcast transmission, wherein multiple relay nodes transmit the same content at the same time on the same time/freq resources;
b) A MBSFN broadcast transmission in a single cell;
c) One or more multicast/unicast transmissions to multiple identified UE's, where a number or each UE provides feedback to the RN, the RN selecting power level, modulation coding scheme, time and/or frequency resources and optionally beam forming settings so that all UEs receive the transmission (either on one or more multicast channels and unicast channels);
d) Data is transferred from the RN 224 to UEs using multiple unicast channels.

Figure 7:
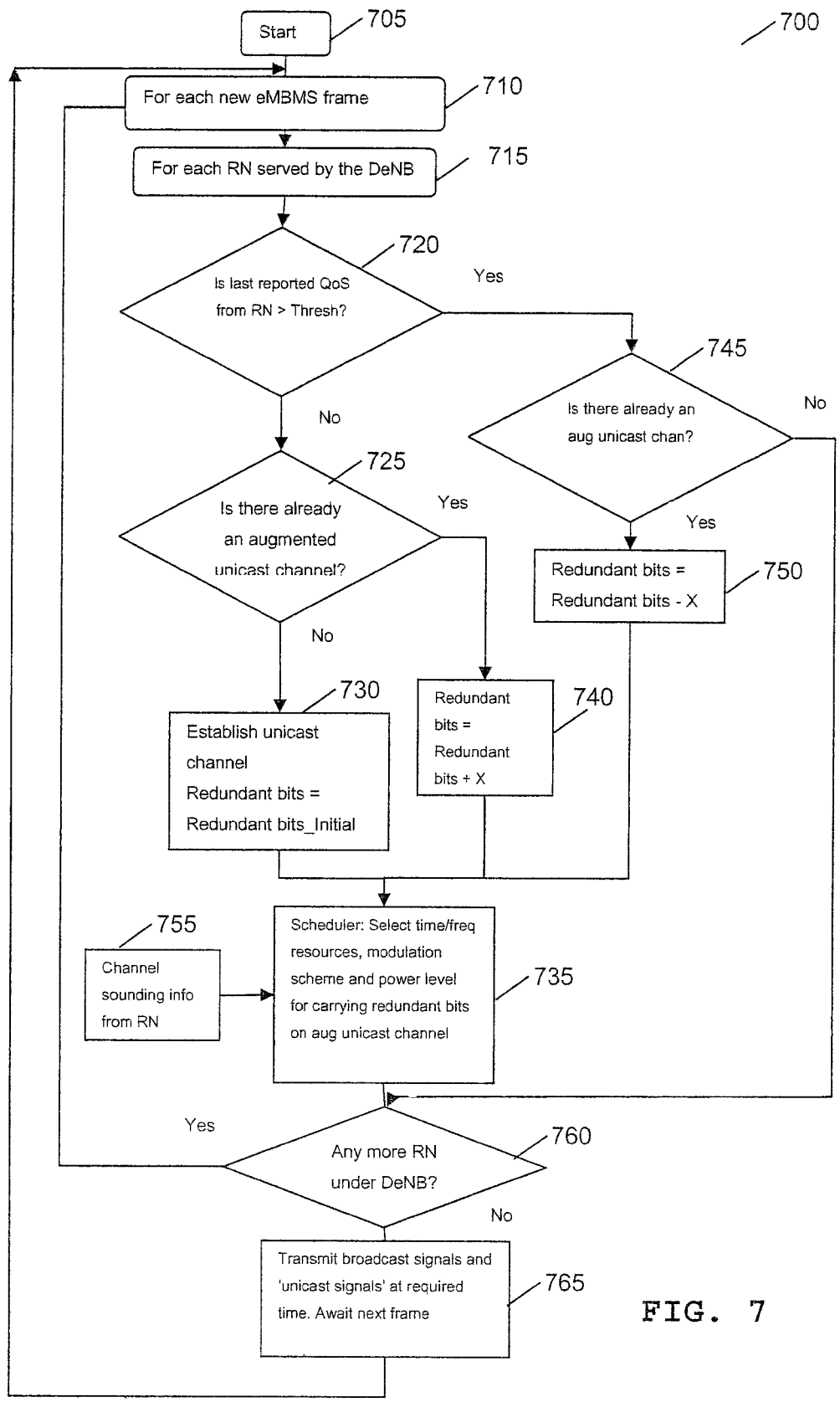
FIG. 7 illustrates an example of a flowchart employed at a donor eNodeB to support broadcast communication to a wireless communication unit in accordance with some example embodiments of the invention.

Referring now to FIG. 7, an example of a flowchart 700 to support broadcast communication at a DeNB 210 is illustrated. The flowchart 700 commences in step 705 and moves onto step 710 where for each new eMBMS data packet frame the DeNB initiates the following process. The method then moves onto step 715 where for each RN 224 served by the DeNB 210, the DeNB 210 initiates the following process. The method then moves onto step 720 where a determination is made as to whether or not the last reported quality of service (QoS) report from the RN is greater than a predetermined or dynamically adjusted threshold QoS level. If, in step 720, the last reported quality of service (QoS) report from the RN is not greater than a predetermined or dynamically adjusted threshold QoS level, the method moves onto step 725 where a determination is made as to whether or not the system/network already employs an augmented unicast channel. If, in step 725 a determination is made that the system/network does not already employ an augmented unicast channel, the method moves onto step 730 whereby an augmented unicast channel is established. In this step, in one example embodiment, the redundant bits may be initialized, and the method moves onto step 735. If, in step 725 a determination is made that the system/network does already employ an augmented unicast channel, the method moves onto step 740 whereby the number of redundant bits employed may be incremented, and the method moves onto step 735.

Referring back to step 720 and in response to the last reported quality of service (QoS) report from the RN being greater than a predetermined or dynamically adjusted threshold QoS level, the method moves onto step 745 where a determination is made as to whether or not the system/network already employs an augmented unicast channel. If, in step 745 a determination is made that the system/network does not already employ an augmented unicast channel, the method moves onto step 760. If, in step 745 a determination is made that the system/network does already employ an augmented unicast channel, the method moves onto step 750 whereby the number of redundant bits employed may be decremented, and the method moves onto step 735.

In step 735, a scheduler is arranged to select one criterion or multiple criteria to be used for the augmented unicast channel, for example selecting a particular time and/or frequency resource, a modulation scheme to be employed, a power level for carrying redundant bits on the augmented unicast channel, etc. The scheduler may receive one or more input(s), such as channel sounding information, from the RN 224. The method then moves onto step 760, whereby a determination is made as to whether any more RNs fall under the control and communication coverage of the DeNB. If in step 760, it is determined that more RNs fall under the control and communication coverage of the DeNB, the method loops back to step 715. However, in step 760, if it is determined that no more RNs fall under the control and communication coverage of the DeNB, the method moves onto step 765 and both broadcast transmissions and the augmented unicast transmissions are sent at the required and scheduled times. The next frame is then awaited and the process loops back to step 710.

Figure 8:
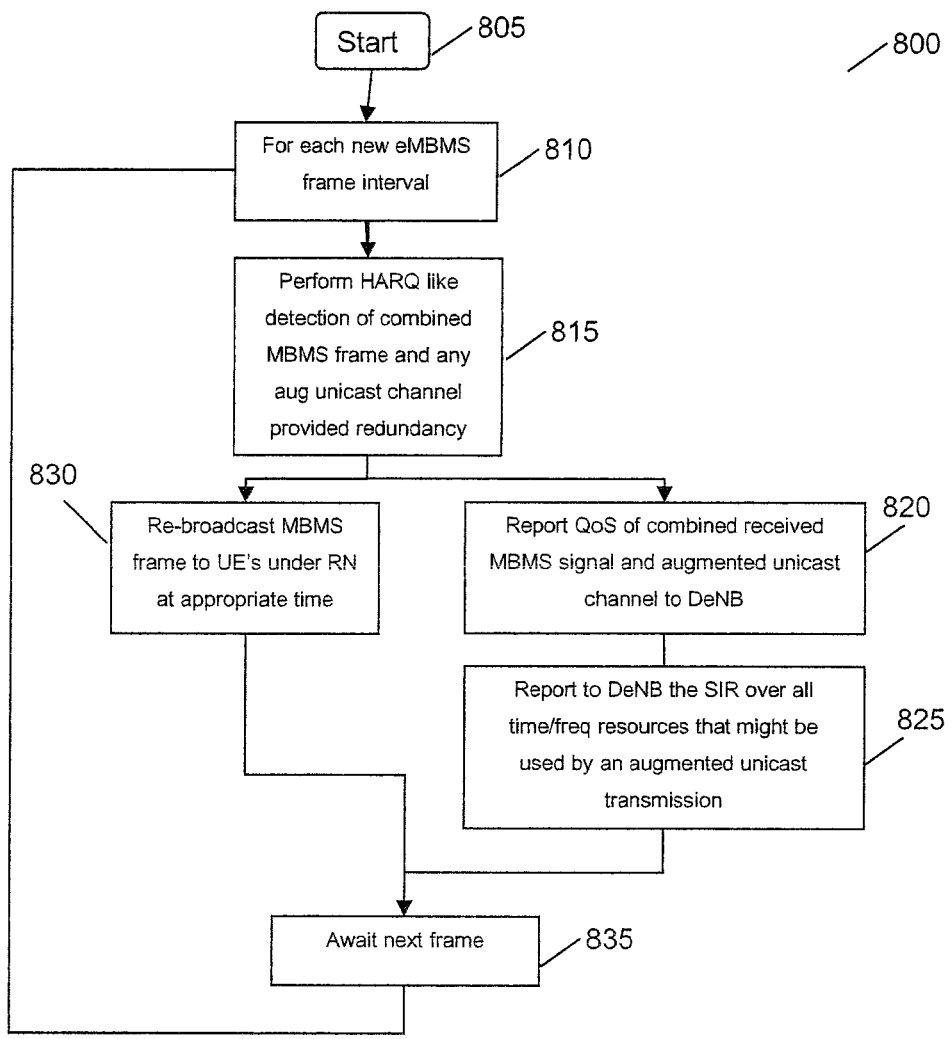
FIG. 8 illustrates an example of a flowchart employed at a Relay Node to support broadcast communication by a wireless communication unit in accordance with some example embodiments of the invention.

Referring now to FIG. 8, an example of a flowchart 800 to support broadcast communication at a RN, such as RN 224, is illustrated. The flowchart 800 commences in step 805 and moves onto step 810, where for each new eMBMS data packet frame interval, the RN initiates the following process. The method then moves onto step 815, whereby the RN determines whether there is a unicast transmission and if so performs an HARQ like combining of the MBMS broadcast signal and the unicast signal. The RN then re-broadcasts each MBMS frame to UEs under the RN's coverage area at an appropriate, scheduled time, as shown in step 830. In some example embodiments, the RN then substantially concurrently reports one or more QoS parameter(s) within the combined, received MBMS signal and the augmented unicast channel to its DeNB, as shown in step 820. The RN may then report a signal-to-interference (or similar) measurement to the DeNB over a number/all of the time and/or frequency resources that may be used by the augmented unicast transmission, as shown in step 825. Following step 825 or step 820, the method then moves onto step 835 and the RN awaits the next received MBMS frame, before looping back to step 815.

Figure 9:
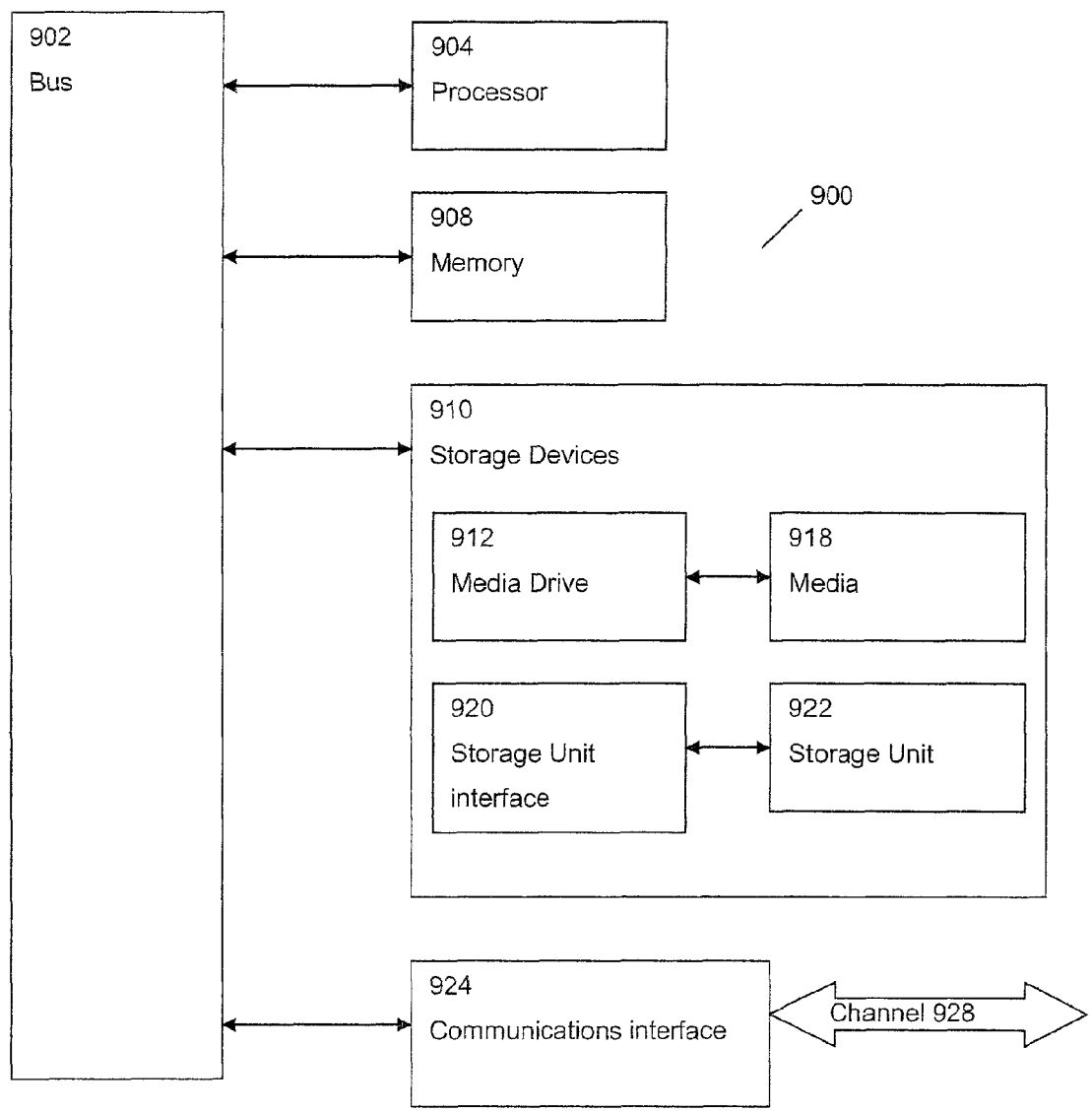
FIG. 9 illustrates a typical computing system that may be employed to implement signal processing functionality in embodiments of the invention.

Referring now to FIG. 9, there is illustrated a typical computing system 900 that may be employed to implement signal processing functionality in embodiments of the invention. Computing systems of this type may be used in access points and wireless communication units. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc.

Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 922, drive 912 or communications interface 924. The control logic (in this example, software instructions or computer program code), when executed by the processor 904, causes the processor 904 to perform the functions of the invention as described herein.

In one example, a tangible non-transitory computer program product comprises executable program code for supporting broadcast transmission in a wireless communication system that comprises a plurality of communication cells, with broadcast content being routed from a base station to at least one wireless communication unit via at least one relay node (RN). The executable program code may be operable for, when executed at the base station broadcasting the broadcast content from the base station to the at least one RN.

In one example, a tangible non-transitory computer program product comprises executable program code for supporting broadcast transmission in a wireless communication system that comprises a plurality of communication cells, with broadcast content being routed from a base station to at least one wireless communication unit via at least one relay node (RN). The executable program code may be operable for, when executed at the at least one wireless communication unit, receiving broadcast content from the base station; receiving subsequently the same broadcast content from the at least one RN; and buffering and combining both broadcast transmissions to decode the broadcast content It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 308 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

The invention claimed is:

1. A method for supporting broadcast transmission in a wireless communication system that comprises a plurality of communication cells, with non-rebroadcasted broadcast content being routed from a base station to at least one wireless communication unit via at least one relay node (RN), wherein the method comprises, at the base station:
broadcasting the non-rebroadcasted broadcast content from the base station to the at least one RN and the at least one wireless communication unit at the same time; and
supplementing the broadcast transmission with at least one augmented unicast transmission associated with the non-rebroadcasted broadcast content, wherein:
the at least one augmented unicast transmission carries additional error coding redundancy bits associated with the broadcast content;
transmission of the at least one augmented unicast transmission is dynamically initiated to the at least one RN; and
the broadcast content is multimedia multicast content.

2. The method of claim 1 wherein the additional error coding redundancy bits are computed from the broadcast content.

3. The method of claim 2 wherein the at least one augmented unicast transmission does not convey the broadcast content.

4. The method of claim 1 wherein the at least one augmented unicast transmission carries the same content, either partially or in its entirety, as the broadcast content.

5. The method of claim 1 wherein the at least one augmented unicast transmission does not convey the broadcast content.

6. The method of claim 1 wherein the at least one augmented unicast transmission does not convey the broadcast content.

7. The method of claim 1 further comprising dynamically adjusting a parameter of the at least one augmented unicast transmission, wherein the parameter comprises at least one from a group consisting of:
a transmit power level used for the at least one augmented unicast transmission;
a data rate employed on the augmented unicast transmission;
a selected modulation scheme;
a selected time and/or frequency resource on which the augmented unicast transmission is to be made;
a number of redundant physical layer bits conveyed on the augmented unicast transmission.

8. The method of claim 7 wherein at least one of dynamically initiating and dynamically adjusting is implemented based on at least one from a group consisting of:
a prevailing channel condition between the base station and the at least one RN;
feedback information on a signal quality of a broadcast channel provided from the at least one RN to the base station;
a quality of a combined broadcast and unicast transmission.

9. The method of claim 1 wherein at least one of dynamically initiating and dynamically adjusting is implemented based on at least one from a group consisting of:
a prevailing channel condition between the base station and the at least one RN;
feedback information on a signal quality of a broadcast channel provided from the at least one RN to the base station;
a quality of a combined broadcast and unicast transmission.

10. The method of claim 1 wherein the base station is a donor eNodeB in a Long Term Evolution (LTE) version of a Third Generation Partnership Project (3GPP™) system.

11. A non-transitory computer program product comprising executable program code for supporting broadcast transmission in a wireless communication system that comprises a plurality of communication cells, with non-rebroadcasted broadcast content being routed from a base station to at least one wireless communication unit via at least one relay node (RN), the executable program code operable for, when executed at the base station:
broadcasting the non-rebroadcasted broadcast content from the base station to the at least one RN and the at least one wireless communication unit at the same time; and
supplementing the broadcast transmission with at least one augmented unicast transmission associated with the non-rebroadcasted broadcast content, wherein:
the at least one augmented unicast transmission carries additional error coding redundancy bits associated with the broadcast content;
transmission of the at least one augmented unicast transmission is dynamically initiated to the at least one RN; and
the broadcast content is multimedia multicast content.

12. A base station for supporting broadcast transmission in a wireless communication system that comprises a plurality of communication cells, with non-rebroadcasted broadcast content being routed from the base station to at least one wireless communication unit via at least one relay node (RN), the base station comprising memory coupled with processor configured for:
broadcasting the non-rebroadcasted broadcast content to the at least one RN and the at least one wireless communication unit at the same time; and
supplementing the broadcast transmission with at least one augmented unicast transmission associated with the non-rebroadcasted broadcast content, wherein:
the at least one augmented unicast transmission carries additional error coding redundancy bits associated with the broadcast content;
transmission of the at least one augmented unicast transmission is dynamically initiated to the at least one RN; and
the broadcast content is multimedia multicast content.

13. An integrated circuit for a base station for supporting broadcast transmission in a wireless communication system that comprises a plurality of communication cells, with non-rebroadcasted broadcast content being routed from the base station to at least one wireless communication unit via at least one relay node (RN), wherein the integrated circuit comprises memory coupled with processor configured for:
broadcasting the non-rebroadcasted broadcast content to the at least one RN and the at least one wireless communication unit at the same time; and
supplementing the broadcast transmission with at least one augmented unicast transmission associated with the non-rebroadcasted broadcast content, wherein:
the at least one augmented unicast transmission carries additional error coding redundancy bits associated with the broadcast content;
transmission of the at least one augmented unicast transmission is dynamically initiated to the at least one RN; and
the broadcast content is multimedia multicast content.

14. A method for supporting broadcast transmission in a wireless communication system that comprises a plurality of communication cells, with non-rebroadcasted broadcast content being routed from a base station to at least one wireless communication unit via a relay node (RN), wherein the method comprises, at the relay node:
- receiving a broadcast transmission of non-rebroadcasted broadcast content from the base station at the same time the non-rebroadcasted broadcast content is routed to the at least one wireless communication unit; and
- receiving a supplementary at least one augmented unicast transmission from the base station wherein the at least one augmented unicast transmission is associated with the non-rebroadcasted broadcast content, wherein:
  - the at least one augmented unicast transmission carries additional error coding redundancy bits associated with the broadcast content;
  - transmission of the at least one augmented unicast transmission is dynamically initiated to the at least one RN; and
  - the broadcast content is multimedia multicast content.

15. A non-transitory computer program product comprising executable program code for supporting broadcast transmission in a wireless communication system that comprises a plurality of communication cells, with non-rebroadcasted broadcast content being routed from a base station to at least one wireless communication unit via a relay node (RN), the executable program code operable for, when executed at the relay node:
- receiving a broadcast transmission of non-rebroadcasted broadcast content from the base station at the same time the non-rebroadcasted broadcast content is routed to the at least one wireless communication unit; and
- receiving a supplementary at least one augmented unicast transmission from the base station wherein the at least one augmented unicast transmission is associated with the non-rebroadcasted broadcast content, wherein:
  - the at least one augmented unicast transmission carries additional error coding redundancy bits associated with the broadcast content;
  - transmission of the at least one augmented unicast transmission is dynamically initiated to the at least one RN; and
  - the broadcast content is multimedia multicast content.

16. A relay node for supporting broadcast transmission in a wireless communication system that comprises a plurality of communication cells, with non-rebroadcasted broadcast content being routed from a base station to at least one wireless communication unit via the relay node (RN), the RN comprising memory coupled with processor configured for:
- receiving a broadcast transmission of the non-rebroadcasted broadcast content from the base station at the same time the non-rebroadcasted broadcast content is routed to the at least one wireless communication unit; and
- receiving a supplementary at least one augmented unicast transmission from the base station wherein the at least one augmented unicast transmission is associated with the non-rebroadcasted broadcast content, wherein:
  - the at least one augmented unicast transmission carries additional error coding redundancy bits associated with the broadcast content;
  - transmission of the at least one augmented unicast transmission is dynamically initiated to the RN; and
  - the broadcast content is multimedia multicast content.

17. An integrated circuit for a relay node for supporting broadcast transmission in a wireless communication system that comprises a plurality of communication cells, with non-rebroadcasted broadcast content being routed from the base station to at least one wireless communication unit via the relay node (RN), wherein the integrated circuit comprises memory coupled with processor configured for:
- receiving a broadcast transmission of the non-rebroadcasted broadcast content from the base station at the same time the non-rebroadcasted broadcast content is routed to the at least one wireless communication unit; and
- receiving a supplementary at least one augmented unicast transmission from the base station wherein the at least one augmented unicast transmission is associated with the non-rebroadcasted broadcast content, wherein:
  - the at least one augmented unicast transmission carries additional error coding redundancy bits associated with the broadcast content;
  - transmission of the at least one augmented unicast transmission is dynamically initiated to the RN; and
  - the broadcast content is multimedia multicast content.

* * * * *